United States Patent [19]

Graf et al.

[11] 4,038,096

[45] July 26, 1977

[54] BITUMINOUS EMULSION-MINERAL AGGREGATE COMPOSITIONS CONTAINING SILANES AS ADHESION PROMOTERS

[75] Inventors: Peter E. Graf, Orinda; Robert J. Schmidt, El Cerrito, both of Calif.

[73] Assignee: Chevron Research Company, San Francisco, Calif.

[21] Appl. No.: 331,425

[22] Filed: Feb. 12, 1973

[51] Int. Cl.² .......................... C08L 95/00; C09D 3/24
[52] U.S. Cl. .................................. 106/277; 106/273 N
[58] Field of Search ............. 106/273 N, 287 SB, 277; 260/448 L, 448.8

[56] References Cited

U.S. PATENT DOCUMENTS

| 2,570,185 | 10/1951 | Aldrich | 106/273 N |
| 3,108,971 | 10/1963 | Mertens | 106/277 X |
| 3,861,433 | 1/1975 | Doi | 106/273 N |

FOREIGN PATENT DOCUMENTS 800,685  11/1950  Germany .............................. 106/277

*Primary Examiner*—Joseph L. Schofer
*Assistant Examiner*—Herbert J. Lilling
*Attorney, Agent, or Firm*—C. J. Tonkin; J. T. Brooks

[57] ABSTRACT

Surfacing compositions are provided which comprise a mixture of mineral aggregate, the residuum of a bituminous emulsion and a silane of the formula $$R^b - R^a - Si - X_3$$

wherein (a) X represents halogen or alkoxy, (b) $R^a$ represents alkylene and (c) $R^b$ represents amino, aminoalkylene amino, gamma-glycidoxy, hydrocarbyl, acyloxy or mercapto.

9 Claims, No Drawings

BITUMINOUS EMULSION-MINERAL AGGREGATE COMPOSITIONS CONTAINING SILANES AS ADHESION PROMOTERS

BACKGROUND OF THE INVENTION

1. Field of the Invention

The present invention relates to bituminous surfacing compositions and more particularly to compositions for use in paving construction, which compositions have improved adhesion of the bituminous binder to the mineral aggregate. The improved adhesion is obtained by including in the surfacing composition a silane as described hereinbelow. The silane may be added to the asphalt prior to emulsion formation or to the mineral aggregate prior to mixing with the emulsion. The compositions show a surprising increase in the adhesion of the binder to the mineral aggregate even when completely immersed in water for extended periods.

DESCRIPTION OF THE PRIOR ART

A wide variety of silicon compounds including silanes have been used for impregnation and surface treatment of glass fibers to promote the adhesion of various organic resins such as the polyester resins, epoxide resins or phenol formaldehyde resins and for the the surface treatment of textiles, leathers, ceramics and glass materials.

It has been found that the adhesion of asphalt to siliceous aggregates could be markedly improved by first treating the aggregate with vapors of a mixture of methylchlorosilanes. However, this exotic method of application of the silanes to the aggregate is not practical in large scale applications. Sanderson, F. C., "Methylchlorosilanes as Anti-stripping Agents", Proceedings, Highway Research Board, 31, 288 (1952).

U.S. Pat. No. 2,570,185 (106-273) issued October 9, 1951 discloses that the reaction product of aminoalkoxysilanes and high molecular weight aliphatic primary amines containing at least 6 carbon atoms may be added to asphalt to improve the coating properties and antistripping properties of the asphalt. The only example of a silane shown in this reference is di-t-butoxy-diamino silane. U.S. Pat. No. 2,985,678 (260-448.8) issued May 23, 1961 discloses that higher alkyl or aryl radicals in silicon compounds progressively lower the stability of the compounds. However, the tertiary butyl radical is shown to increase the stability of the silicon compounds, even in silicon compounds which contain long chain alkyl such as lauryl group.

German Pat. No. 800,685 teaches silanes as asphalt adhesion agents. The useful silanes are said to be of the formula $SiR_mX_n$ wherein X represents a halogen or an alkoxy, R represents an organic residue and m and n represent integers of from 1 to 3. Specific examples of R include methyl, phenyl and 2-chloro-ethylene.

The patent literature, particularly class 106, subclasses 273 and 277, is replete with attempts to improve the adhesion of asphalt binders to mineral aggregate. The patent literature referring to silicon compound chemistry continually is concerned with the thermal stability of silicon compounds. Thus it may be seen it is highly desirable that compounds of any type be found which not only promote the adhesion of asphalt to mineral aggregate but also remain stable over a wide temperature range and for an extended period. In addition to this it is highly desirable that the adhesion promoters be capable of being used without exotic application methods. Preferably the promoter should be susceptible of introduction into the asphalt in the molten state, into bituminous emulsions once they are formed, application to the mineral aggregate prior to mixing with the bituminous emulsions, or combinations of the above.

SUMMARY OF THE INVENTION

It is now found that particular trihalo and trialkoxy silanes are useful for promoting the adhesion of bitumen to mineral aggregate. These silanes are susceptible of introduction into bituminous emulsion-mineral aggregate surfacing compositions at any stage of their preparation. Furthermore, these silanes increase the quantity of asphalt retained on the aggregate after severe hot water stripping tests. Typically, a ten to twentyfold increase in retained asphalt is found compared to the results with conventional anti-stripping agents.

In brief, the surfacing compositions of the invention comprise (A) a mineral aggregate, (B) the residuum of a bituminous emulsion comprising a bituminous binder, a water soluble emulsifier, and water; and (C) a trihalo or trialkoxy silane of the formula set forth below.

DETAILED DESCRIPTION OF THE INVENTION

The surfacing compositions of this invention in which the adherence of the bitumen to the mineral aggregate is substantially increased comprise: (A) 100 parts by weight of a mineral aggregate; (B) the residuum from 3 to 150 parts by weight of a bituminous emulsion comprising (1) about 50 to 80 percent by weight of a bituminous binder, (2) from about 0.1 to about 5.0 percent by weight of a water soluble emulsifier, and (3) water to make 100 percent by weight of the emulsion; and (C) from 0.001 to 0.10 parts by weight of a silane of the formula:

$$R^b - R^a - Si - X_3 \qquad (I)$$

The Mineral Aggregate

The particular mineral aggregates used to form the surfacing compositions of this invention are not critical. They may be siliceous in nature, e.g. granite and the like or calcareous in nature e.g. limestone and the like or mixtures thereof. However, both calcareous and siliceous type aggregates have certain preferred requirements concerning the composition of the emulsions with which they are mixed. Emulsions may be tailored for the particular types of mineral aggregates. Often this is not practical. The presence of the silane in the composition reduces the sensitivity of the emulsion to aggregate type.

The Bituminous Emulsion

The bituminous emulsions are comprised of (1) about 50 to about 80 percent, preferably from about 60 to about 75 percent by weight of a bituminous binder, (2) from about 0.1 to about 5.0 percent preferably from about 0.5 to about 4 percent by weight of a water soluble emulsifier and (3) water to make 100 percent of the emulsion. The particular composition of the bituminous emulsion is not critical to the invention. Any emulsions suitable for the preparation of bituminous surfacing compositions are contemplated as being useful in the subject invention.

The emulsions are prepared by conventional means (such as a colloid mill) well known to those of ordinary skill in the art. See for example U.S. Pat. Nos. 2,838,663 and 2,862,830.

The Emulsifier

The emulsifiers used in the preparation of the bituminous emulsions used in this invention may be any of those well known in the prior art for the preparation of bituminous emulsions. These include cationic emulsifiers such as the well known N-fatty alkyl polymethylene diamines, the alkyl quaternary ammonium salts, the polyethoxylated derivatives of N-fatty alkyl polymethylene diamine and the like. Satisfactory emulsifiers also include anionic emulsifiers which may be any of those well known in the prior art such as the water soluble salts, e.g. sodium and potassium salts of hydrocarbon substituted sulfonic, sulfuric, phosphonic, phosphoric and carboxylic acids. Yet another type of emulsifier is the non-ionic emulsifier such as polyethoxylated nonyl-phenol. The nature of the emulsifiers does not form part of this invention.

The Bituminous Binder

A wide variety of bituminous binders may be used to prepare the bituminous emulsions for use in the subject invention. In general, any paving grade bituminous binder satisfactory for preparing paving compositions is contemplated as being useful in the subject invention. Paving grade asphalts can have a wide range of penetration values ranging from as low as 30 or 40 dmm for the harder asphalts to 200 to 300 dmm at 77° F. (100 g., 5 sec.) for the softer asphalts. The most widely used paving asphalts generally have a penetration at 77° F. of about 50–60 or 60–70 dmm.

Water

The bituminous emulsions used in preparing the surfacing compositions of this invention have water present as a continuous phase, i.e. bitumen is present as discrete particles in the water. The quantity of water used to prepare the bituminous emulsion is critical only to the extent that a workable, stable emulsion is obtained. The choice of the exact amount of water to be used in the preparation of a particular emulsion is well within those skilled in the art and the specification thereof does not form part of this invention.

Prewetting Water

It is often found advantageous to prewet the mineral aggregate with water prior to mixing with the bituminous emulsion. The amount of prewetting water used is readily determined by one skilled in the art but typically is from about zero to about 40 parts, generally not more than 30 parts, per 100 parts of aggregate.

The Adhesion Promotors

The adhesion promoters used in the preparation of the surfacing compositions of this invention are the trihalo, or trialkoxy silanes of formula I above.

In formula I above:

a. X represents halogen, e.g. flourine, chlorine, bromine and the like, preferably chlorine, or alkoxy containing 1 to 4 carbon atoms, e.g., methoxy, ethoxy, propoxy, isopropoxy, butoxy, isobutoxy, sec-butoxy, tert-butoxy;

b. $R^a$ represents alkylene preferably containing 2 to 4 carbon atoms, e.g. ehtylene, trimethylene, methylethylene, alpha-methyl trimethylene, betamethyl trimethylene, tetramethylene, and the like;

c. $R^b$ represents amino; aminoalkylene amino, preferably containing 1 to 3 carbon atoms, e.g. amino methylene amino, aminoethylene amino, aminotrimethylene amino, aminoethylethylene amino; gammaglycidoxy; hydrocarbyl, preferably containing from 12 to 19 carbon atoms, e.g. dodecyl, tridecyl, tetradecyl, pentadecyl, hexadecyl, heptadecyl, actadecyl, nonadecyl, and the like; acyloxy, preferably containing 2 to 4 carbon atoms, e.g. ethanoyloxy, propanoyloxy, butanoyloxy, 2-butenoyloxy, methacryloxy, and the like; or mercapto.

The silanes are present in the surfacing composition in an amount effective to substantially increase the amount of bitumen remaining on the aggregate after the water immersion test described below. By substantially is meant at least 10 percent and preferably at least 50 percent relative to the amount of bitumen coating aggregate in surfacing compositions not containing an adhesion promoter. In general, the amount of silanes necessary to substantially increase the bitumen coating the aggregate after the stripping test will range from about 0.0001 parts to about 0.10 part by weight per 100 parts of mineral aggregate present in the surfacing composition. Preferably, the silanes are present in amounts ranging from about 0.0001 to about 0.01 parts by weight per 100 parts of mineral aggregate.

The silanes can be introduced into the surfacing compositions in a variety of ways during the manufacture of the surfacing compositions.

The silanes can be added to molten asphalt prior to preparation of the emulsion. The concentration of silane in the asphalt must be adjusted to yield the proper concentration when the emulsion is mixed with the aggregate. Generally, the silane will be present in the asphalt in from about 0.001 to about 1.0 percent by weight, preferably from about 0.005 to about 0.5 percent by weight.

Another method is to pretreat the aggregate with the silane prior to addition of the emulsion. Since very small quantities of silane are used relative to the aggregate, the silane is most conveniently added to the aggregate in the form of a solution. Suitable solvents include water and most of the inert liquid hydrocarbon solvents which are compatible and nonreactive with the silane. Examples include benzene, toluene, xylene, pentane, and the like. There are a number of limitations attendant to the pretreatment of the aggregate with a hydrocarbon solution of the silane. These include the requirement that the aggregate be moderately dry during silane application. Second, the presence of the volatile solvent represents both an air pollution problem and a fire hazard. Third, slurries prepared from treated aggregate are sometimes somewhat congealed and not easily poured or worked. For greatest economy and ease of handling, the preferred solvent for silane pretreatment of the aggregate is water. Most conveniently, the silane is dissolved in the water used to prewet the aggregate.

In all cases contact with water should be held to a minimum of time. If the silane is added to the asphalt before emulsification, the emulsion should be used within a few hours of preparation. If the silane is added to the aggregate through the prewetting water, the silane-water solution should be used within a few hours of preparation. However, the prewet aggregate can be used as needed since the silane does not lose its effectiveness once applied to the aggregate even in the presence of moisture.

Other Materials

In addition to the above ingredients of the surfacing compositions of the invention, a number of other materials can be present. These include set initiators which are used to promote the breaking of the emulsion, additional emulsifiers or other surface active agents can be added to enhance various physical properties such as pumpability, workability, mixing and the like. These can include some of the emulsifiers particularly the nonionic emulsifiers mentioned above. Other additives which can be present include those which affect the physical properties of the residuum after the emulsion has broken and the asphalt has set. Such additives improve the high and low temperature characteristics of the asphalt. Other additives are often present to improve the stability of the emulsion during storage or to contribute to the ease of manufacture.

In general, any additives which have been used in the prior art to improve the emulsion or the resulting surfacing compositions and which are compatible with the silanes can be added to the surfacing compositions of this invention. The selection and use of these additives is not a part of this invention and such matters are well within the purvue of those skilled in the art. The testing of the compatibility of proposed additives with the silanes used in this invention is straightforward and easily conducted. Small samples can be prepared and tested by the water immersion test described below as well as other standard tests used to determine the properties of bituminuous emulsion type surfacing compositions.

The Surfacing Compositions

The surfacing compositions of the invention are prepared by mixing together, in the proportions indicated above, the mineral aggregate, the bituminous emulsion, the silane, and water (if any). For best results, the components are preferably intimately mixed to obtain a uniform distribution of the emulsion, silane, and water onto the surface of the mineral aggregate.

cured, generally at an elevated temperature to accelerate curing. Depending upon the particular composition curing conditions may range from ambient temperature to 325° F. or higher for several hours or more. Following dehydration, the samples, at room temperature, are subjected to water immersion. Typically, a variety of immersion conditions are investigated. These can include (a short exposure in) boiling water, typically one or two minutes; longer exposures at room temperature, e.g., 140° F. and 180° F., 1, 4 and 8 days, and 3 months. The percent coating remaining on the aggregate at completion of the water immersion test is rated visually on a scale of 0–100%. For purposes of quality control one or more of the above conditions are often omitted and only the boiling water test is conducted.

In the following examples, all parts are parts by weight unless otherwise expressed.

EXAMPLE I

Effect of Short Term Water Immersion on Adhesion

A quick setting anoinic emulsion is prepared by conventional means from a steam refined asphalt (63.0% w.) having a penetration of 50–60 at 77° F.; an alkali metal alpha olefin sulfonate (40% active) (1.62% w.), bentonite clay (0.5% w.), and water (34.88% w.). A Bristol silica stone graded such that 100% passes a ⅜ inch U.S. Standard sieve and 100% is retained on an ¼ inch U.S. Standard sieve is pretreated with a benzene solution of 3-{N-(2-aminoethyl) amino} propyltrimethoxysilane such that residual concentrations of 8, 20 and 40 parts per million silane on the aggregate are obtained.

A number of samples of surfacing compositions are obtained by first warming 8 parts of the above emulsion to about 60° C. and mixing with 100 parts of the pretreated aggregate at room temperature. Samples containing untreated aggregate are prepared as a control. Identical samples are cured at 93° C., 135° C., and 163° C. for three hours. The cured samples are subjected to the various water immersion conditions. Table I shows results obtained after immersion at 21° C., 60° C., and 82° C., for 1 and 3 days and at the boiling point of water for 2 minutes.

TABLE I

| | | PERCENT COATING AFTER IMMERSION AS A FUNCTION OF SILANE CONCENTRATION AND CURING TEMPERATURE | | | | | | | | | | | | | | |
|---|---|---|---|---|---|---|---|---|---|---|---|---|---|---|---|---|
| Immersion Temperature | | 21° C | | | | 60° C | | | | 82° C | | | | Boiling Water | | | |
| Immersion Time | Cure* Temp., ° C | Concentration Silane - Relative to Aggregate, ppm | | | | | | | | | | | | | | | |
| | | 0 | 8 | 20 | 40 | 0 | 8 | 20 | 40 | 0 | 8 | 20 | 40 | 0 | 8 | 20 | 40 |
| 1-Day | 163 | 100[b] | 100[b] | 100[b] | 100[b] | 95[c] | 100[c] | 100[c] | 100[c] | 70[d] | 90[d] | 90[d] | 85[d] | 100[a] | 100[a] | 100[a] | 100[a] |
| | 135 | 95 | 100 | 100 | 100 | 10 | 70 | 100 | 100 | 10 | 60 | 80 | 95 | 50 | 95 | 100 | 100 |
| | 93 | 70 | 98 | 100 | 100 | 10 | 60 | 100 | 100 | 10 | 40 | 50 | 60 | 2 | 75 | 85 | 95 |
| 3-Day | 163 | 100[c] | 100[c] | 100[c] | 100[c] | 95[c] | 100[c] | 100[c] | 100[c] | 90[f] | 100[f] | 100[f] | 100[f] | | | | |
| | 135 | 95[c] | 95[c] | 95[c] | 10 | 70 | 85 | 90 | 5 | 50[g] | 70[g] | 85[g] | | | | | |
| | 93 | 45[e] | 100[e] | 100[e] | 100[e] | 10 | 50[g] | 70[g] | 80[g] | 5 | 40[g] | 60[g] | 70[g] | | | | |

*Three hours at elevated temperature after 18 hours at 200° F
[a]Coating slightly wrinkled but coherent
[b]Wrinkled, coherent, but fragile, coating
[c]Dull, brittle coating; can be chipped off with spatula
[d]Dull, waxy surface; thinning, many small collapsed "blisters" but coherent
[e]Good, glossy, black coating
[f]Very dull, waxy - almost completely thin, brown surface that is scraped off easily to a coherent black coating
[g]Wrinkled prune look; water penetrates, produces blisters; their collapse on drying produces wrinkles since skin still attached and coherent

TEST OF ASPHALT-AGGREGATE ADHESION

The Water Immersion Test: Stripping Resistance

Surfacing composition samples are prepared by mixing the required amount of emulsion with 100 parts of aggregate. Either the emulsion or the aggregate or both can be warmed as required by the particular composition. Subsequent to mixing, the test composition is As can be seen, for a given curing condition, the presence of the silane markedly improves the ability of the asphalt to resist stripping while immersed in water at elevated temperatures. In all cases, the more severe the immersion conditions, the greater the difference between the treated and untreated aggregate.

It also can be seen that at a given additive level adhesion of the asphalt to the aggregate is generally better at the higher curing temperature probably because the asphalt has a better chance to flow and wet the aggregate and conform to its rugosities and depressions. Also, some hardening of the asphalt is observed in the form of a slight browning of the coating after the extended cure. This is especially noticeable at the 325° C cure temperature.

EXAMPLE II

Effect of Long Term Water Immersion on Adhesion

Surfacing compositions are prepared as in Example I from 8 parts of emulsion and 100 parts of untreated and pretreated aggregate. The samples thus prepared are cured as in Example I and immersed in water maintained at room temperature (approximately 20° C.), and 60° C., for 3 months. The amount of asphalt still adhering to the aggregate is rated visually. The results are shown in Table II.

TABLE II

Percent Coating After Immersion For Three Months

| Immersion Temperature | Room Temp. | | 60° C | | | |
|---|---|---|---|---|---|---|
| Silane Concentration Relative to aggregate ppm | 0 | 8 | 0 | 8 | 20 | 40 |
| Temperature of cure, ° C | | | | | | |
| 93 | 10 | >90 | ca0 | 40 | 60 | 70 |
| 135 | 50 | >90 | | | | |
| 163 | 90 | >90 | | | | |

EXAMPLE III

ABRASION RESISTANCE TEST

Effect of Adhesion Promoter Addition to Asphalt on Durability of Slurry Seal

Several adhesion promoters including 3-{N-2-aminoethyl) amino} propyltrimethoxysilane are added to samples of molten asphalt at various concentrations as shown in Table IIIB. The treated asphalt is used to prepare emulsions as described in Example I. Slurry seals are prepared using these emulsions and Logan Quarry Granite Dust from Watsonville, California. This granite dust has been found to be a "typical" aggregate useful as a "reference" slurry seal aggregate. The gradation of the aggregate is shown in Table IIIA.

TABLE IIIA

| Gradation of Logan Quarry Granite Dust | |
|---|---|
| U.S. Standard Sieve No. | Percent Passing |
| 4 | 100 |
| 8 | 97 |
| 16 | 78 |
| 30 | 59 |
| 50 | 45 |
| 100 | 32 |
| 200 | 21 |
| Sand Equivalent = 51 | |

The slurry seals are prepared by first adding 0.24 part of Portland cement, Type I to 100 parts of the aggregate and mixing. The aggregate-cement mixture is then prewet with 12 parts of water. To the prewet mixture is added 20 parts of the emulsion. Each slurry mixture is then formed into a ¼ inch thick disc by pouring it into a circular opening of a template resting on a larger circle of heavy smooth roofing felt. Since the cements acts as a setting agent, the mixture should be poured into the template within 1 or 2 minutes after preparation. After initial set of the slurry, the template is removed and the discs are cured at ambient temperature for 46 hours. The cured discs are then subjected to an abrasion test. In this test each disc is immersed in water maintained at 25° C. for the time shown in Table IIIB. Subsequent to immersion, the disc is secured to the bottom of a metal pan and covered with at least one-fourth inch of distilled water. A 5 inches length of ¾ inch I.D. reinforced rubber base is mounted in a 5 lb. weighted holding device operated by a mechanical mixer of the planetary type and brought into contact with the disc surface. The disc is abraded with rubber hose for 5 minutes at 144 rpm. The abraded specimen is washed free of debris, dried to constant weight at 60° C. and weighed. The loss in weight is converted to grams per square foot and is shown in Table IIIB.

TABLE IIIB

Effect on Adhesion Promoters in Asphalt on Durability of Slurry Seals

| Adhesion Promoter | Weight % 5 | Moisture After Cure, %W | Days Immersed | Wear Loss gm/sq.ft. |
|---|---|---|---|---|
| None | 0.0 | 8.7 | 1 | 300+ |
| None | 0.0 | 8.8 | 5 | 300+ |
| Dehydro H86[1] | 0.5 | 12.1 | 1 | 300+ |
| Dehydro H86 | 0.5 | 11.6 | 5 | 300+ |
| Arquad T[2] | 0.25 | 10.4 | 1 | 300+ |
| Arquad T | 0.25 | 10.5 | 5 | 300+ |
| Bitumine 812[3] | 0.10 | 9.4 | 1 | 300+ |
| Bitumine 812 | 0.10 | 14.3 | 5 | 300+ |
| Bitumine 812 | 0.25 | 9.3 | 1 | 300+ |
| Bitumine 812 | 0.25 | 9.0 | 5 | 300+ |
| Diam 11C[4] | 0.001 | 7.8 | 1 | 300+ |
| Diam 11C | 0.001 | 7.4 | 5 | 300+ |
| Diam 11C | 0.002 | 5.0 | 1 | 187 |
| Diam 11C | 0.002 | 4.4 | 5 | 269 |
| Silane | 0.001 | 11.3 | 1 | 155 |
| Silane | 0.001 | 10.1 | 5 | 123 |

[1]Hydrocarbyl mixed amines available from Tretolite Co. as an asphalt antistrip agent.
[2]Tallow trimethyl ammonium chloride, 50% W active material in alcohol.
[3]Believed to be an amido amine available from No Strip Chemical Works, Inc., as an asphalt emulsifier and antistrip agent.
[4]N-crude oleyl-1. 3-propylene diamine available from General Mills.
[5]of the asphalt As can be seen from Table IIIB only one prior art adhesion promoter improved slurry seal durability. However, even this additive had to be used at twice the treatment level of the silane to produce inferior results.

EXAMPLE IV

Effect of Adhesion Promoter Addition to Aggregate on Durability of Slurry Seal

Several adhesion promoters including the silane of Example III are dissolved in solvents and added to granite dust samples (which included 0.24% cement) at the concentrations shown in Table IV. Slurry seal specimens are prepared for abrasion testing and tested as in Example III. The compositions comprise 100 parts aggregate, 0.24 parts cement, 20 parts emission, 10 parts water, unless otherwise noted. The specimens are cured either (1) to constant weight in a 60° C constant draft oven or (2) ambient cured to constant weight. The water immersion procedure is specified in Table IV.

TABLE IV

| Adhesion Promoter/Solvent | Weight Percent | Moisture After Cure % W. | Cure Proc.[1] | Immersion Procedure[2] | Wear Loss gm/sq.ft. |
|---|---|---|---|---|---|
| None | — | 5.8 | 1 | 1-Day | 193 |

TABLE IV-continued

| Adhesion Promoter/Solvent | Weight Percent | Moisture After Cure % W. | Cure Proc.[1] | Immersion Procedure[2] | Wear Loss gm/sq.ft. |
|---|---|---|---|---|---|
| None | — | 4.5 | 1 | Vac.-Sat. | 80 |
| Silane/Benzene | 0.01 | 4.1 | 1 | 1-Day | 156 |
| Silane/Benzene | 0.01 | 4.1 | 1 | Vac.-Sat. | 89 |
| Silane/Benzene | 0.05 | 4.9 | 1 | 1-Day | 40 |
| Silane/Benzene | 0.05 | 4.3 | 1 | Vac.-Sat. | 27 |
| Silane/Benzene | 0.05 | 9.4 | 2 | 1-Hour | 58[3] |
| Silane/Benzene | 0.05 | 9.1 | 2 | 1-Hour | 64[3] |
| Silane/Benzene | 0.05 | 5.9 | 1 | Vac.-Sat. | 27[3] |
| Silane/Benzene | 0.05 | 5.7 | 1 | Vac.-Sat. | 43[3] |
| Silane/Benzene | 0.05 | 0 | 1 | 1-Day | 6[3] |
| Silane/Benzene | 0.05 | 0 | 1 | Vac.-Sat. | 15[3] |
| Dehydro H86/HCl[4] | 0.01 | 2.8 | 1 | 1-Day | 86 |
| Dehydro H86/HCl[4] | 0.01 | 5.0 | 1 | Vac.-Sat. | 70 |
| Diam 11C/HCl[5] | 0.01 | 5.8 | 1 | 1-Day | 174 |
| Diam 11C/HCl[5] | 0.01 | 1.6 | 1 | Vac.-Sat. | 73 |
| Al(NO$_3$)$_3$/H$_2$O | 0.01 | 6.0 | 1 | 1-Day | 193 |
| Al(NO$_3$)$_3$/H$_2$O | 0.01 | 4.9 | 1 | Vac.-Sat. | 138 |

[1] See description in text of Example IV.
[2] 1-Day = one day immersion at room temperature; Vac.-Sat. = saturation with water under vacuum.
[3] 14 parts prewetting water were used rather than 10 parts.
[4] See Table IIIB.
[5] See Table IIIB.

As can be seen from the above data the silane gave wear control at least equal to that obtainable with conventional antistrip agents used at the recommended treatment levels. When the silane treatment levels are increased slightly, wear levels as low as 6 grams per square feet were obtained.

We claim:

1. A surfacing composition comprising (A) 100 parts by weight of a mineral aggregate, (B) the residuum from 3 to 150 parts by weight of a bituminous emulsion comprising (1) about 50 to 80 percent by weight of a bituminous binder, (2) from about 0.1 to about 5.0 percent by weight of a water soluble emulsifier, and (3) water to make 100 percent by weight of the emulsion, and (C) from 0.0001 to 0.05 parts by weight of a silane of the formula:

$$R^b - R^a - Si - X_3$$

wherein
1. represents halogen or alkoxy,
2. $R^a$ represents alkylene, and
3. $R^b$ represents amino or aminoalkylene amino.

2. A composition of claim 1 wherein:
   a. X represents halogen or alkoxy containing 1 to 4 carbon atoms,
   b. $R^a$ represents an alkylene containing from 2 to 4 carbon atoms, and
   c. $R^b$ represents amino or aminoalkylene amino containing 1 to 3 carbon atoms.

3. A composition of claim 2 wherein said emulsifier is cation-active or anion-active.

4. A composition of claim 3 wherein the components of said composition are intimately mixed.

5. A composition of claim 4 wherein:
   a. X represents chlorine, methoxy or ethoxy,
   b. $R^a$ represents trimethylene, and
   c. $R^b$ represents amino or aminoethylene amino.

6. A surfacing composition of claim 4 wherein said silane is 3-{N-(2-aminoethyl)-amino}-propyl trimethoxy silane.

7. A bituminous emulsion comprising (A) 50 to 80 percent by weight of a bituminous binder, (B) from about 0.1 to about 5.0 percent by weight of a water soluble emulsifier, and (C) about 0.001 to about 1.0 percent weight of a silane of the formula:

$$R^b - R^a - Si - X_3$$

wherein
1. X represents halogen or alkoxy,
2. $R^a$ represents alkylene, and
3. $R^b$ represents amino or aminoalkylene amino.

8. A composition of claim 9 wherein:
   a. X represents halogen or alkoxy containing 1 to 4 carbon atoms,
   b. $R^a$ represents an alkylene containing from 2 to 4 carbon atoms, and
   c. $R^b$ represents amino or aminoalkylene amino containing 1 to 3 carbon atoms.

9. A composition of claim 8 wherein:
   a. X represents chlorine, methoxy or ethoxy,
   b. $R^a$ represents trimethylene, and
   c. $R^b$ represents amino or aminoethylene amino.

* * * * *